US012781024B2

(12) United States Patent
Vizzini et al.

(10) Patent No.: US 12,781,024 B2
(45) Date of Patent: Nov. 3, 2026

(54) FLAME RETARDANT COMPOSITION, PREPREG, AND FIBER REINFORCED COMPOSITE MATERIAL

(71) Applicant: Toray Industries, Inc., Tokyo (JP)

(72) Inventors: Katrina P. Vizzini, Tacoma, WA (US); Benjamin Lehman, Tacoma, WA (US); Jonathan Hughes, Tacoma, WA (US); Alfred P. Haro, Tacoma, WA (US); Toshiya Kamae, Tacoma, WA (US)

(73) Assignee: Toray Industries, Inc., Tokyo (JP)

( * ) Notice: Subject to any disclaimer, the term of this patent is extended or adjusted under 35 U.S.C. 154(b) by 821 days.

(21) Appl. No.: 17/767,526

(22) PCT Filed: Oct. 14, 2020

(86) PCT No.: PCT/IB2020/000851
§ 371 (c)(1),
(2) Date: Apr. 8, 2022

(87) PCT Pub. No.: WO2021/074685
PCT Pub. Date: Apr. 22, 2021

(65) Prior Publication Data
US 2024/0093003 A1 Mar. 21, 2024

Related U.S. Application Data

(60) Provisional application No. 63/082,272, filed on Sep. 23, 2020, provisional application No. 62/923,177, filed on Oct. 18, 2019.

(51) Int. Cl.
*C08J 5/24* (2006.01)
*C08G 59/32* (2006.01)
(Continued)

(52) U.S. Cl.
CPC ........ *C08K 5/5313* (2013.01); *C08G 59/3227* (2013.01); *C08G 59/38* (2013.01);
(Continued)

(58) Field of Classification Search
CPC ......... C08K 5/5313; C08J 5/249; C08J 5/243; C08J 2363/02; C08J 2429/14;
(Continued)

(56) References Cited

U.S. PATENT DOCUMENTS 5,624,979 A 4/1997 Kleiner et al.
5,648,171 A 7/1997 von Gentzkow et al.
(Continued)

FOREIGN PATENT DOCUMENTS

EP 1731553 A1 12/2006
EP 3309190 A1 4/2018
(Continued)

OTHER PUBLICATIONS

Sinochem Nanjing, https://www.sinochem-nanjing.com/products/reagents-chemicals/polyvinyl-formal.html, accessed on May 13, 2026. (Year: 2026).*
(Continued)

*Primary Examiner* — David T Karst
(74) *Attorney, Agent, or Firm* — Buchanan Ingersoll & Rooney PC

(57) ABSTRACT

This invention relates to a flame retardant fiber-reinforced composite material based on an epoxy resin composition which includes at least one epoxy resin having an epoxy functionality of at least 2 as well as at least one organic phosphinic acid or derivative thereof (e.g., an organic phosphinic acid-modified epoxy resin), reinforced with a fiber having a thermal conductivity≥3 W/m·K at room temperature, as well as a prepreg for making such a flame retardant fiber-reinforced composite material. More specifically, a
(Continued)

composite material is provided that contains a combination of particular types of epoxy resins, curatives, and reinforcing fibers that provide sufficient flame retardance for thin-ply laminates when cured at 163° C. for 15 minutes. These cured composites are also suitable for a variety of applications requiring flame retardancy.

15 Claims, 1 Drawing Sheet

(51) Int. Cl.

| | |
|---|---|
| ***C08G 59/38*** | (2006.01) |
| ***C08G 59/44*** | (2006.01) |
| ***C08G 59/50*** | (2006.01) |
| ***C08G 59/68*** | (2006.01) |
| ***C08K 5/5313*** | (2006.01) |
| ***C08L 63/00*** | (2006.01) |

(52) U.S. Cl.
CPC ........... *C08G 59/44* (2013.01); *C08G 59/504* (2013.01); *C08G 59/686* (2013.01); *C08J 5/243* (2021.05); *C08J 5/249* (2021.05); *C08L 63/00* (2013.01); *C08J 2363/02* (2013.01); *C08J 2429/14* (2013.01)

(58) Field of Classification Search
CPC .... C08G 59/3227; C08G 59/38; C08G 59/44; C08G 59/504; C08G 59/686; C08L 63/00
USPC .......................................................... 523/222
See application file for complete search history.

(56) References Cited

U.S. PATENT DOCUMENTS

| | | | |
|---|---|---|---|
| 6,548,627 | B1 | 4/2003 | Hörold |
| 2009/0002541 | A1 | 1/2009 | Niwamae |
| 2014/0350149 | A1 | 11/2014 | Schneider et al. |
| 2019/0027913 | A1 | 1/2019 | Sang et al. |
| 2021/0132372 | A1 | 5/2021 | Kuratani et al. |

FOREIGN PATENT DOCUMENTS

| | | | |
|---|---|---|---|
| JP | 8507814 | A | 8/1996 |
| JP | 8239448 | A | 9/1996 |
| JP | 2000351828 | A | 12/2000 |
| JP | 2003330082 | A | 11/2003 |
| JP | 2004289532 | A | 10/2004 |
| JP | 2009010736 | A | 1/2009 |
| JP | 2009165032 | A | 7/2009 |
| JP | 2014208839 | A | 11/2014 |
| JP | 2015031564 | A | 2/2015 |
| JP | 2015507658 | A | 3/2015 |
| JP | 2017002202 | A | 1/2017 |
| JP | 2017218522 | A | 12/2017 |
| JP | 2019505412 | A | 2/2019 |
| JP | 2019167429 | A | 10/2019 |
| WO | 2018198465 | A1 | 11/2018 |

OTHER PUBLICATIONS

Chempoint, https://www.chempoint.com/insights/dmf-solvents-for-polymeric-coatings-and-inks?srsltid=AfmBOopW0mid-DAhvLxwLTEY-BttD_37YplzlsB-NqSli8zNd-Z5ltcY, accessed on May 13, 2026. (Year: 2026).*
International Search Report and Written Opinion for International Application No. PCT/IB2020/000851, dated Feb. 9, 2021, 8 pages.
International Preliminary Report on Patentability and Written Opinion for International Application No. PCT/IB2020/000851, issued Apr. 19, 2022, 6 pages.
Anonymous, "Carbon Fiber Tow (Continuous fiber)", Mitsubishi Chemical Carbon Fiber & Carbon Fiber Reinforced Plastics Special Site, May 24, 2022, retrieved from the Internet Sep. 21, 2023, https://www.m-chemical.co.jp/carbon-fiber/en/product/tow/, 10 pages.
Extended European Search Report for European Application No. 20 87 6429, dated Oct. 4, 2023, 13 pages.
International Preliminary Report on Patentability for International Application No. PCT/JP2020/000851, dated Sep. 28, 2021, 5 pages.
International Search Report and Written Opinion for International Application No. PCT/JP2020/000851, dated Mar. 24, 2020, 7 pages.

* cited by examiner

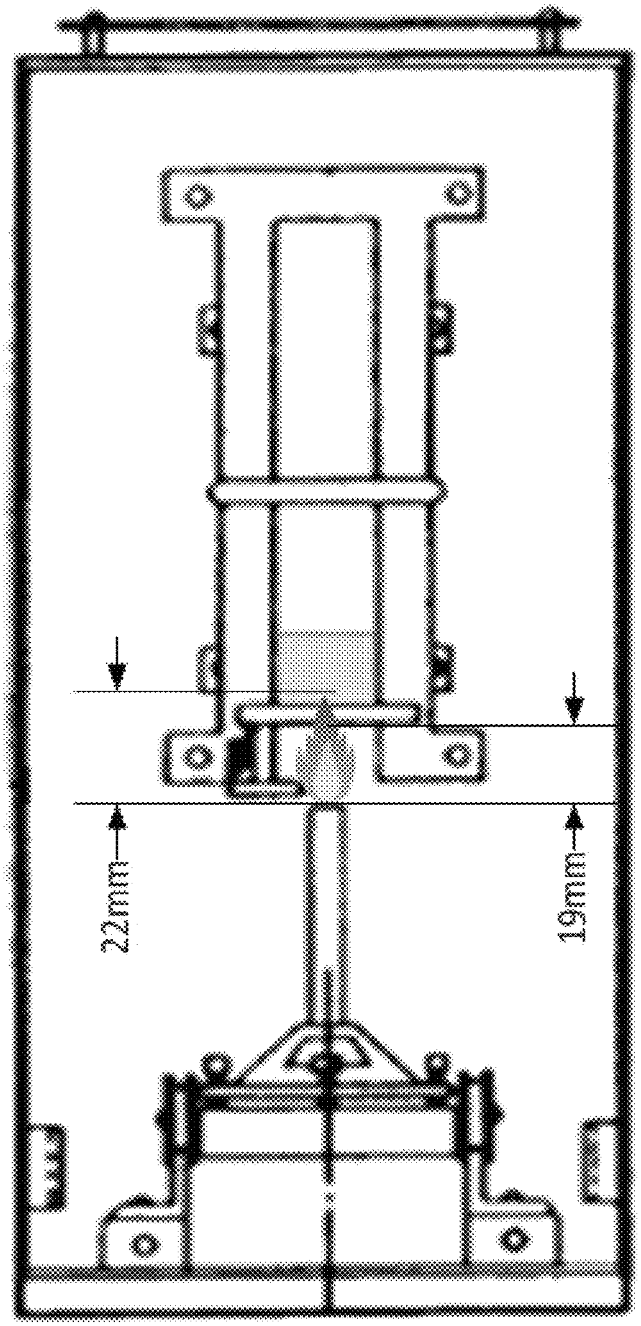
22mm
19mm

FLAME RETARDANT COMPOSITION, PREPREG, AND FIBER REINFORCED COMPOSITE MATERIAL

CROSS REFERENCE TO RELATED APPLICATIONS

This is the U.S. National Phase application of PCT/IB2020/000851, filed Oct. 14, 2020 which claims priority from U.S. Provisional Application No. 62/923,177, filed on Oct. 18, 2019, and from U.S. Provisional Application No. 63/082,272, filed on Sep. 23, 2020, the disclosures of each of these applications being incorporated herein by reference in their entireties for all purposes.

FIELD OF THE INVENTION

The present invention relates to a flame retardant composition, a prepreg, and a fiber-reinforced composite material having a thermoset epoxy resin matrix which provides excellent flame-retardance and is suitable for production using modern fast-cure heating systems.

BACKGROUND OF THE INVENTION

Fiber Reinforced Composite (FRC) materials comprising a reinforcing fiber and a matrix resin (sometimes also referred to as fiber-reinforced composite materials) have excellent mechanical properties, such as stiffness and strength, while being lighter weight than other more traditional materials, and are therefore utilized in a variety of applications such as aircraft, spacecraft, automobiles, rail vehicles, ships, sporting goods, and computers, with the demand continuing to increase over time. An increasingly common requirement of industrial applications is to have improved flame retardancy without compromising the relative low cost of manufacturing, raw materials, and mechanical and thermal performance of the material.

Halogen flame retardants were conventionally used to provide flame retardancy to a variety of materials, FRC included. Examples of halogen flame retardants include halogenated epoxy resins having a halogen such as bromine or chlorine, like tetrabrominated bisphenol A. However, halogen flame retardants are strongly avoided due to the possibility of releasing toxic gases such as halogenated hydrogen and organic halides during the combustion process. As a result, flameproofing methods substituting halogen-based flame retardants, include methods of adding red phosphorus or phosphoric acid ester compounds to a matrix resin, have become mainstream.

However, a method of adding red phosphorus or phosphoric acid ester compounds to a matrix resin has problems such as: 1) a decline in mechanical strength; 2) poor storage stability; 3) red phosphorus or phosphoric acid ester compounds gradually seeping into the environment over a long time period; and 4) red phosphorus and phosphoric acid ester compounds are easily hydrolyzed, so use is difficult in printed circuit boards, electronic materials, etc. in which insulation properties and water resistance are highly demanded.

An additional common halogen-free flameproofing method for resins is the addition of an inorganic flame retardant such as a metal hydroxide. However, when the added amount of inorganic flame retardant is increased, a problem arises in that the mechanical strength of the cured resin declines. The decline in the mechanical strength of a cured resin causes a decline in the mechanical strength of the fiber-reinforced composite material. It is difficult to obtain sufficient flame retardancy with an added amount on the order that maintains the mechanical strength demanded in the fiber-reinforced composite material.

The present invention has been made taking the above matters into account, and has an object, among others, of providing a composite material having superior flame retardance without containing halogen-based flame retardants, red phosphorus, or phosphoric acid ester, and does not rely on the addition of inorganic flame retardants such as metal hydroxides.

SUMMARY OF THE INVENTION

As a result of thorough investigation, the present inventors have found that superior flame retardancy is imparted to fiber-reinforced composite materials by using specific types of phosphorus-containing chemicals in combination with specific types of reinforcing fibers. The flame retardant compositions used in the preparation of such fiber-reinforced composite materials, which includes the phosphorus-containing chemical(s), also maintains the mechanical and heat resistance properties of analogous epoxy resin based flame retardant compositions which do not include such phosphorus-containing chemicals, provided that adjustments in the formulation are made to maintain the crosslink density of the cured epoxy resin composition. Namely, the present invention includes the following embodiments:

(1) A flame retardant composition useful for producing a flame retardant fiber-reinforced composite material, comprising i) an epoxy resin composition comprised of (or consisting essentially of or consisting of) a component [A], a component [B], and a component [C], and ii) a component [D] wherein:

the epoxy resin composition has a phosphorus content of at least 0.5% by weight based on the total weight of the epoxy resin composition;

the component [A] is comprised of at least one epoxy resin;

the component [B] is comprised of at least one organic phosphinic acid;

the component [C] is comprised of at least one curing agent; and the component [D] is comprised of at least one reinforcing fiber with a thermal conductivity≥3 W/m·K at room temperature.

In an embodiment of the flame retardant composition, the at least one organic phosphinic acid includes at least one organic phosphinic acid corresponding to formula (I):

(I)

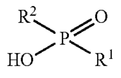

wherein $R^1$ and $R^2$ are independently selected from an alkyl group having from 1 to 10 carbon atoms and an aryl group having from 6 to 10 carbon atoms. In an embodiment, $R^1$ and $R^2$ in formula (I) are each an ethyl group. In another embodiment, the at least some portion of the component [A] is pre-reacted with at least some portion of the component [B].

(2) A flame retardant composition useful for producing a flame retardant fiber-reinforced composite material, comprising i) an epoxy resin composition comprising a component [C] and a component [E] and ii) a component [D] wherein:

the epoxy resin composition has a phosphorus content of at least 0.5% by weight based on the total weight of the epoxy resin composition;

the component [C] is comprised of at least one curing agent;

the component [D] is comprised of at least one reinforcing fiber with a thermal conductivity≥3 W/m·K at room temperature; and the component [E] is comprised of at least one epoxy resin that contains at least one residue of at least one organic phosphinic acid.

In an embodiment of the flame retardant composition, the at least one residue of at least one organic phosphinic acid corresponds to formula (II):

(II)

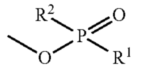

wherein $R^1$ and $R^2$ of formula (II) are independently selected from an alkyl group having from 1 to 10 carbon atoms and an aryl group having from 6 to 10 carbon atoms.

In an embodiment, the component [E] includes at least one epoxy resin corresponding to formula (III):

(III)

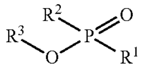

wherein $R^1$ and $R^2$ of formula (III) are independently selected from an alkyl group having from 1 to 10 carbon atoms and an aryl group having from 6 to 10 carbon atoms, and $R^3$ of formula (III) is a residue of a multifunctional epoxy resin in which at least one epoxy group has been reacted to introduce a substituent —O—P(═O)$R^1R^2$ and the at least one epoxy resin corresponding to formula (III) has at least one unreacted epoxy group. In an embodiment, $R^3$ in formula (III) is a residue of at least one tetraglycidyl diaminodiphenyl methane.

In an aspect of the flame retardant compositions, as disclosed hereinabove, the epoxy resin composition additionally comprises at least one accelerator. In an embodiment, the at least one accelerator includes at least one aromatic urea. The at least one aromatic urea may be present in the epoxy resin composition in a total amount ranging from 0.5 to 7 PHR. In another embodiment, the at least one curing agent includes at least one dicyandiamide. The at least one dicyandiamide may be present in the epoxy resin composition in a total amount ranging from 1 to 7 PHR.

In an aspect of the flame retardant composition, the component [A] of the epoxy resin composition includes at least one tetraglycidyl diaminodiphenyl methane.

In another aspect of the flame retardant composition, the epoxy resin composition additionally comprises at least one thermoplastic. In an embodiment, the at least one thermoplastic includes at least one polyvinylformal.

In an aspect, the flame retardant composition, the at least one reinforcing fiber includes at least one carbon fiber. The at least one carbon fiber may be selected from the group consisting of pitch-based carbon fibers and PAN-based carbon fibers.

In an aspect, the at least one reinforcing fiber is a layer of reinforcing fibers and the flame retardant composition, of embodiment (1), embodiment (2), or both embodiment (1) and embodiment (2), is in a form of a prepreg comprising a layer of reinforcing fibers impregnated with the epoxy resin composition. In an embodiment, the layer of the reinforcing fibers is unidirectional or fabric. In another embodiment, the fiber-reinforced composite material may be obtained by curing the at least one prepreg at a temperature of from 120° C. to 180° C.

BRIEF DESCRIPTION OF THE DRAWING

The FIGURE shows the test setup of the neat resin flammability testing inspired by SFI 56.1 specifications, as further described in the Examples.

DETAILED DESCRIPTION OF EMBODIMENTS OF THE INVENTION

As used herein, the phrase "an epoxy resin composition" is used interchangeably with "epoxy composition" and "flame retardant epoxy resin composition" refers to an epoxy resin composition that, upon curing, provides a cured resin having flame retardant properties such as a low burn time of less than 10 seconds and a low burn length of not more than 0.7 inches, as determined by a flammability test modified from the SFI 56.1 flammability test specification for application to neat resin specimens. As used herein, the phrase "flame retardant composition" refers to a flame retardant intermediate material, to provide a flame retardant fiber-reinforced composite material, comprising at least one reinforcing fiber and an epoxy resin composition that, upon curing, provides a cured resin having flame retardant properties such as a low burn time of less than 10 seconds and a low burn length of not more than 0.7 inches, as determined by a flammability test modified from the SFI 56.1 flammability test specification for application to neat resin specimens. As used herein, the phrase "flame retardant fiber-reinforced composite material" refers to a material having flame retardant properties which is a composite of reinforcing fibers in a matrix of a cured thermosettable resin (i.e., a matrix of a thermoset resin). Thus, the phrase "a composition useful for producing a flame retardant fiber-reinforced composite material" refers to a flame retardant composition that is capable of being cured to provide a flame retardant fiber-reinforced composite material.

The terms "approximately", "about" and "substantially" as used herein represent an amount close to the stated amount that still performs the desired function or achieves the desired result. For example, the terms "approximately", "about", and "substantially" may refer to an amount that is within less than 10% of, within less than 5% of, within less than 1% of, within less than 0.1% of, and within less than 0.01% of the stated amount.

The term "room temperature" as used herein has its ordinary meaning as known to those skilled in the art and may include temperatures within the range of about 15° C. to 43° C.

In accordance with the present disclosure, a flame retardant composition comprises (i) an epoxy resin composition and (ii) at least one reinforcing fiber. The epoxy resin composition includes a component [A] comprising at least one epoxy resin; a component [B] comprising at least one organic phosphinic acid, and a component [C] comprising at least one curing agent. In an embodiment, the epoxy resin composition comprises a component [E], where the component [E] is a reaction product of the component [A] and the component [B]. In an embodiment, the epoxy resin composition comprises at least some portion of the component [A] pre-reacted with at least some portion of the component [B]. In other embodiments, the epoxy resin composition includes a component [E] comprising at least one epoxy resin that contains at least one residue of at least one organic phosphinic acid and a component [C] comprising at least one curing agent. In another embodiment, the epoxy resin composition includes a component [A], a component [C], and a component [E]. In yet another embodiment, the epoxy resin composition includes a component [B], a component [C], and a component [E]. An epoxy resin composition of the present disclosure has a phosphorus content of at least 0.5% by weight based on the total weight of the epoxy resin composition. In various embodiments, the epoxy resin composition of the present disclosure maintains the mechanical and heat resistance properties of analogous epoxy resin based flame retardant compositions which do not include such phosphorus-containing chemicals, provided that adjustments in the formulation are made to maintain the crosslink density of the cured epoxy resin composition.

In an embodiment, the flame retardant compositions are completely free or substantially free of halogen-substituted products, epoxy resins having a fluorene skeleton and halogenated epoxy resins. In other embodiments, the flame retardant compositions may include one or more of halogen-substituted products, epoxy resins having a fluorene skeleton and halogenated epoxy resins in a suitable amount to further improve the fire retardancy of the composite material.

Component [B]

In an embodiment of the flame retardant composition, the component [B] is comprised of or consists essentially of or consists of at least one organic phosphinic acid. The organic phosphinic acid utilized in the present invention is not particularly limited. Organic phosphinic acids are compounds containing at least one >P(=O)OH functional group wherein the phosphorus atom is additionally substituted by two organic groups (e.g., alkyl and/or aryl groups) which may be the same as or different from each other, wherein a carbon atom in each organic group is directly bonded to the phosphorus atom. Organic phosphinic acids have the general formula $R_2PO_2H$, wherein the two hydrogen atoms directly bound to phosphorus in phosphinic acid ($PO_2H_3$) are replaced by organic groups R. The organic groups R may be hydrocarbon groups, but in certain embodiments may comprise one or more types of atoms in addition to carbon and hydrogen atoms such as N, O, halogen, etc. For example, the organic group(s) may be substituted with a hydroxyl or carboxylic acid group. However, in preferred embodiments, the organic phosphinic acid is halogen-free. Dialkyl phosphinic acids, diaryl phosphinic acids and alkylaryl phosphinic acids, as well as combinations thereof, are all suitable for use in the present invention.

According to certain embodiments, the epoxy resin composition is comprised of, or is prepared using, one or more organic phosphinic acids corresponding to formula (I):

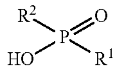

(I)

wherein $R^1$ and $R^2$ are independently selected from an alkyl group having from 1 to 10 carbon atoms and an aryl group having from 6 to 10 carbon atoms. In an embodiment, $R^1$ and $R^2$ are identical to each other. In another embodiment, $R^1$ and $R^2$ are different from each other. The alkyl group may be linear, branched, and/or alicyclic. Suitable alkyl groups having from 1 to 10 carbon atoms include, but are not limited to methyl, ethyl, n-propyl, isopropyl, iso-octyl, cyclohexyl. Suitable aryl groups having from 6 to 10 carbon atoms include, but are not limited to phenyl, tolyl, naphthyl.

Examples of suitable organic phosphinic acids include, but are not limited to: dimethyl phosphinic acid, methylethyl phosphinic acid, diethyl phosphinic acid, dipropyl phosphinic acid, ethyl phenyl phosphinic acid, di(isooctyl) phosphinic acid, diphenyl phosphinic acid, methylbenzyl phosphinic acid, naphthylmethyl phosphinic acid, methylphenyl phosphinic acid and combinations thereof. Diethyl phosphinic acid is particularly preferred for use in embodiments of the present invention.

The flame retardant epoxy resin composition may contain an amount of the organic phosphinic acid, in unreacted form, as shown in formula (I) or reacted form, as shown in formula (II) and formula (III), or a mixture of unreacted and reacted form, such that total phosphorus content is at least 0.5% by weight of the total weight of the epoxy resin composition. If the amount of phosphorus is at least 0.5% by weight, the epoxy resin composition, when cured, will pass most flame retardance tests at a specified thickness. In other embodiments, the phosphorus content can be greater than 1.5% to impart a level of fire retardancy to the cured epoxy resin composition that will be sufficient to pass most testing specifications even with very thin specimens. Typically, the epoxy resin composition need not contain more than 5% by weight phosphorus in order to achieve satisfactory flame retardancy for most purposes and end use applications. Moreover, if the phosphorus content is increased without making appropriate adjustments in the crosslink density, the mechanical performance of the cured epoxy resin composition may be reduced. In certain embodiments, all or nearly all of the phosphorus content in the flame retardant epoxy resin composition is attributable to one or more organic phosphinic acids and/or organic phosphinic acid-modified epoxy resins as described herein, although other types of phosphorus-containing compounds could also be present in addition to organic phosphinic acid(s) and organic phosphinic acid-modified epoxy resin(s). According to certain embodiments, at least 70%, at least 75%, at least 80%, at least 85%, at least 90%, at least 95% or at least 99% or 100% of the phosphorus content of the flame retardant epoxy resin composition is contributed by the organic phosphinic acid(s) and/or organic phosphinic acid-modified epoxy resin(s).

Component [E]

In certain embodiments of the invention, the flame retardant epoxy resin composition contains a component [E] comprising or consisting essentially of or consisting of at least one epoxy resin that contains at least one residue of at least one organic phosphinic acid (including residues of any of the above-mentioned organic phosphinic acids). Such a residue corresponds to an organic phosphinic acid that has reacted with, and therefore become incorporated into, an epoxy resin. Such epoxy resin further contains at least one epoxy group and may be regarded as an organic phosphinic acid-modified epoxy resin or an adduct of an organic phosphinic acid and a multifunctional epoxy resin. An epoxy resin useful as the component [E] in the present invention may be obtained by reacting an organic phosphinic acid with a multifunctional epoxy resin (i.e., an epoxy resin containing two or more epoxy groups per molecule), the stoichiometry being controlled such that one or more epoxy groups of the multifunctional epoxy resin remain unreacted. In the course of such reaction, the acid group of the organic phosphinic acid may ring-open an epoxy group of the starting multifunctional epoxy resin.

For example, the at least one residue of at least one organic phosphinic acid may correspond to formula (II):

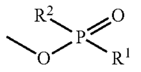

(II)

wherein $R^1$ and $R^2$ of formula (II) are independently selected from an alkyl group having from 1 to 10 carbon atoms and an aryl group having from 6 to 10 carbon atoms.

In certain embodiments of the invention, the component [E] may include at least one epoxy resin corresponding to formula (III):

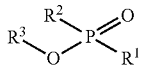

(III)

wherein $R^1$ and $R^2$ of formula (III) are independently selected from an alkyl group having from 1 to 10 carbon atoms and an aryl group having from 6 to 10 carbon atoms, and $R^3$ of formula (III) is a residue of a multifunctional epoxy resin in which at least one epoxy group has been reacted to introduce a substituent $—O—P(=O)R^1R^2$ and wherein the at least one epoxy resin corresponding to formula (III) has at least one unreacted epoxy group.

Thus, in certain embodiments of the invention, any one of the multifunctional epoxy resin structures present in the flame retardant epoxy resin composition contains at least one organic phosphinic acid residue, where one or more of the multi-functional epoxy resin's reactive sites (e.g., epoxy groups) are occupied by the structure of formula (II) and at least one epoxy group of the starting multifunctional epoxy resin remains unreacted (and thus capable of reacting when the epoxy resin composition is cured).

As an illustrative and nonlimiting example, a multifunctional epoxy resin which is a diglycidyl ether of bisphenol A may be reacted with one equivalent of diethyl phosphinic acid to yield an organic phosphinic acid-modified epoxy resin useful as or in component [E] of the present invention:

$$(CH_3CH_2)_2P(=O)OH+GE\text{-}Ar—C(CH_3)_2—Ar\text{-}GE \rightarrow (CH_3CH_2)_2P(=O)OCH_2CH(OH)CH_2—Ar—C(CH_3)_2—Ar\text{-}GE$$

wherein Ar=arylene and GE=glycidyl ether. Any suitable arylene may be used, such as a benzene ring.

The at least one epoxy resin that contains at least one residue of at least one organic phosphinic acid may, in certain embodiments, be pre-formed prior to formulating the flame retardant epoxy resin composition by carrying out an initial reaction between one or more organic phosphinic acids and one or more multifunctional epoxy resins. Such a pre-reaction may, for example, be performed by blending these components to form a mixture and heating the mixture at a temperature and for a time effective to achieve the desired degree of reaction between the organic phosphinic acid(s) and the multifunctional epoxy resin(s). Such heating may be conducted while stirring or otherwise agitating the mixture. Suitable reaction temperatures may include, for example, a temperature of 50° C. to 150° C. Suitable reaction times may include, for example, a reaction time of 0.1 to 5 hours. Depending upon the stoichiometry selected, a portion of the multifunctional epoxy resin may remain unreacted such that the reaction product obtained and then used in the epoxy resin composition is a mixture of an organic phosphinic acid-modified epoxy resin and a multifunctional epoxy resin that does not contain any organic phosphinic acid residues.

Alternatively, the organic phosphinic acid(s) and multifunctional epoxy resin(s) may undergo reaction in the presence of one or more additional components of the flame retardant epoxy resin composition after the flame retardant epoxy resin composition has been fully or partially formulated (for example, either before or during curing of the flame retardant epoxy resin composition).

The above-described embodiment (wherein at least one epoxy resin that contains at least one residue of at least one organic phosphinic acid is present in the epoxy resin composition) allows for specific types of flame retardant epoxy resin compositions to be made by controlling the reaction of the organic phosphinic acid with specific epoxy resins and at different amounts. Choosing the type of epoxy resin, as disclosed hereinbelow, allows different formulations to be adjusted for toughness, glass transition temperature (Tg), and modulus. For example, using a multifunctional epoxy resin with a functionality of 4 the organic phosphinic acid can be reacted at a 1:4, 2:4, or 3:4 organic phosphinic acid to epoxy equivalent ratio.

In certain embodiments of the present invention, where the flame retardant epoxy resin composition comprises component [E] present either in a pre-reacted form or is formed during curing by reaction of the component [A] and the component [B], where the multifunctional epoxy resin used to prepare the organic phosphinic acid-modified epoxy resin has at least three or more functionality (i.e., three or more epoxy groups per molecule). When the multifunctional epoxy resin has a functionality of three or more, it allows (following reaction with the organic phosphinic acid) for at least two of the epoxy groups to self-polymerize with each other or with the at least one curing agent allowing for good crosslink density. In other embodiments of the present invention, the multifunctional epoxy resin has a functionality of 4 or more, which can provide the benefits of increasing the crosslink density and improving properties such as Tg. In still other embodiments of the present invention, the multifunctional epoxy resin is a glycidyl amine epoxy resin. In still other embodiments of the present invention the multifunctional epoxy resin is a tetraglycidyl diaminodiphenyl methane. When the multifunctional epoxy resin is a tetraglycidyl diaminodiphenyl methane, a high Tg can be maintained for the epoxy resin composition when cured.

In some embodiments, when the flame retardant epoxy resin composition is cured, the glass transition temperature of the cured resin is at least 100° C., in other embodiments at least 110° C., still other embodiments at least 125° C. and to still further embodiments at least 140° C., as determined by the G' onset method (described in more detail in the Examples). When the flame retardant epoxy resin has a Tg greater than 100° C. the cured fiber-reinforced composite material part can resist deformation at higher temperatures and have a greater service temperature to broaden its use. In some embodiments, when the flame retardant epoxy resin composition is cured to provide a cured resin having a flexural modulus of elasticity, the flexural modulus of elasticity of the cured matrix at 25° C. is at least 3.0 GPa, in other embodiments at least 3.4 GPa, and still other embodiments at least 3.8 GPa. When the flame retardant resin has a modulus greater than 3.0 GPa at 25° C. the fiber-reinforced composite material part can have high compression strength to further broaden the material for more structural applications.

In the present invention, the type or types of epoxy resin is/are not particularly limited as long as the effect of the invention is not deteriorated. Di-functional and higher functional epoxy resins and mixtures thereof could be used as the epoxy resin. It is also possible for the epoxy resin composition to contain at least some amount of mono-functional epoxy resin, in addition to one or more multifunctional epoxy resins (i.e., epoxy resins containing two or more reactive epoxy groups per molecule).

In embodiments where the epoxy resin composition comprises the component [E], i.e., at least one epoxy resin that contains at least one residue of at least one organic phosphinic acid (an organic phosphinic acid-modified epoxy resin), such organic phosphinic acid-modified epoxy resin(s) may be the only epoxy resin(s) present in the epoxy resin composition. However, the epoxy resin composition could also contain one or more additional epoxy resins which are not organic phosphinic acid-modified epoxy resins (i.e., epoxy resins that do not contain any organic phosphinic acid residues).

Component [A]

Suitable epoxy resins may be prepared from precursors such as amines (e.g., epoxy resins prepared using diamines and compounds containing at least one amine group and at least one hydroxyl group such as tetraglycidyl diaminodiphenyl methane, tetraglycidyl diaminodiphenylether, tetraglycidyl diaminodiphenylsulfone, tetraglycidyl diaminodiphenylamide, triglycidyl-p-aminophenol, triglycidyl-m-aminophenol, triglycidyl aminocresol and tetraglycidyl xylylenediamine and halogen-substituted products, alkynol-substituted products, hydrogenated products thereof and so on), phenols (e.g., bisphenol A epoxy resins, bisphenol F epoxy resins, bisphenol S epoxy resins, bisphenol R epoxy resins, phenol-novolac epoxy resins, cresol-novolac epoxy resins, resorcinol epoxy resins and triphenlymethane epoxy resins), naphthalene epoxy resins, dicyclopentadiene epoxy resins, epoxy resins having a biphenyl skeleton, isocyanate-modified epoxy resins, epoxy resins having a fluorene skeleton and compounds having a carbon-carbon double bond (e.g., alicyclic epoxy resins). It should be noted that the epoxy resins are not restricted to the examples above. Halogenated epoxy resins prepared by halogenating these epoxy resins can also be used. Furthermore, mixtures of two or more of these epoxy resins, and compounds having one epoxy group or monoepoxy compounds such as glycidylaniline, glycidyl toluidine or other glycidylamines (particularly glycidylaromatic amines) can be employed in the formulation of the epoxy resin composition. When the epoxy resin composition is to be used to prepare a prepreg or a fiber-reinforced composite material, however, it typically will be desirable to limit the amount of mono-functional epoxy resin, to for example, no more than 20 PHR, no more than 15 PHR, no more than 10 PHR, or no more than 5 PHR mono-functional epoxy resin.

In an embodiment, the flame retardant epoxy resin compositions are completely free or substantially free of halogen-substituted products, epoxy resins having a fluorene skeleton and halogenated epoxy resins. In other embodiments, the epoxy resins may include one or more of halogen-substituted products, epoxy resins having a fluorene skeleton and halogenated epoxy resins in a suitable amount to improve the fire retardancy of the material.

Examples of tetraglycidyl diaminodiphenyl methane resins which are commercially available products include "Sumi-epoxy (registered trademark)" ELM434 (manufactured by Sumitomo Chemical Co., Ltd.), YH434L (manufactured by Nippon Steel Chemical Co., Ltd.), "jER (registered trademark)" 604 (manufactured by Mitsubishi Chemical Corporation), and "Araldite (registered trademark)" MY720, MY721, MY9655 and MY9655T (which are manufactured by Huntsman Advanced Materials).

Examples of tetraglycidyl diaminodiphenylsulfones which are commercially available products include TG3DAS (manufactured by Konishi Chemical Ind. Co., Ltd.).

Examples of triglycidyl aminophenol or triglycidyl aminocresol resins which are commercially available products include "Sumi-epoxy (registered trademark)" ELM100 (manufactured by Sumitomo Chemical Co., Ltd.), "Araldite (registered trademark)" MY0500, MY0510, MY0600 and MY0610 (which are manufactured by Huntsman Advanced Materials) and "jER (registered trademark)" 630 (manufactured by Mitsubishi Chemical Corporation).

Examples of tetraglycidyl xylylenediamine and hydrogenated products thereof which are commercially available products include TETRAD-X and TETRAD-C (which are manufactured by Mitsubishi Gas Chemical Company, Inc.).

Examples of bisphenol A epoxy resins which are commercially available include "jER (registered trademark)" 825, "jER (registered trademark)" 828, "jER (registered trademark)" 834, "jER (registered trademark)" 1001, "jER (registered trademark)" 1002, "jER (registered trademark)" 1003, "jER (registered trademark)" 1003F, "jER (registered trademark)" 1004, "jER (registered trademark)" 1004AF, "jER (registered trademark)" 1005F, "jER (registered trademark)" 1006FS, "jER (registered trademark)" 1007, "jER (registered trademark)" 1009 and "jER (registered trademark)" 1010 (which are manufactured by Mitsubishi Chemical Corporation). Examples of brominated bisphenol A epoxy resins which are commercially available include "jER (registered trademark)" 505, "jER (registered trademark)" 5050, "jER (registered trademark)" 5051, "jER (registered trademark)" 5054 and "jER (registered trademark)" 5057 (which are manufactured by Mitsubishi Chemical Corporation). Examples of hydrogenated bisphenol A epoxy resins which are commercially available products include ST5080, ST4000D, ST4100D and ST5100 (which are manufactured by Nippon Steel Chemical Co., Ltd.).

Examples of bisphenol F epoxy resins which are commercially available products include "jER (registered trademark)" 806, "jER (registered trademark)" 807, "jER (registered trademark)" 4002P, "jER (registered trademark)" 4004P, "jER (registered trademark)" 4007P, "jER (registered trademark)" 4009P and "jER (registered trademark)" 4010P (which are manufactured by Mitsubishi Chemical Corporation), and "Epotohto (registered trademark)" YDF2001 and "Epotohto (registered trademark)" YDF2004 (which are manufactured by Nippon Steel Chemical Co., Ltd.). An example of a tetramethyl-bisphenol F epoxy resin which is a commercially available product is YSLV-80XY (manufactured by Nippon Steel Chemical Co., Ltd.).

An example of a bisphenol S epoxy resin which is a commercially available product is "EPICLON (registered trademark)" EXA-154 (manufactured by DIC Corporation). Examples of phenol-novolac epoxy resins which are commercially available products include "jER (registered trademark)" 152 and "jER (registered trademark)" 154 (which are manufactured by Mitsubishi Chemical Corporation), "Araldite (registered trademark)" EPN1138 (which are manufactured by Huntsman Advanced Materials) and "EPICLON (registered trademark)" N-740, N-770 and N-775 (which are manufactured by DIC Corporation).

Examples of cresol-novolac epoxy resins which are commercially available products include "EPICLON (registered trademark)" N-660, N-665, N-670, N-673 and N-695 (which are manufactured by DIC Corporation), and EOCN-1020, EOCN-102S and EOCN-104S (which are manufactured by Nippon Kayaku Co., Ltd.).

An example of a resorcinol epoxy resin which is commercially available is "Denacol (registered trademark)" EX-201 (manufactured by Nagase ChemteX Corporation). Examples of naphthalene epoxy resins which are commercially available products include "EPICLON (registered trademark)" HP-4032, HP-4032D, HP-4700, HP-4710, HP-4770, EXA-4701, EXA-4750, EXA-7240 (which are manufactured by DIC Corporation).

Examples of triphenylmethane epoxy resins which are commercially available products include "jER (registered trademark)" 1032S50 (which are manufactured by Mitsubishi Chemical Corporation), "Tactix (registered trademark)" 742 (manufactured by Huntsman Advanced Materials) and EPPN-501H (which are manufactured by Nippon Kayaku Co., Ltd.).

Examples of dicyclopentadiene epoxy resins which are commercially available products include "EPICLON (registered trademark)" HP-7200, HP-7200L, HP-7200H and HP-7200HH (which are manufactured by DIC Corporation), "Tactix (registered trademark)" 558 (manufactured by Huntsman Advanced Materials), and XD-1000-1L and XD-1000-2L (which are manufactured by Nippon Kayaku Co., Ltd.).

Examples of epoxy resins having a biphenyl skeleton which are commercially available products include "jER (registered trademark)" YX4000H, YX4000 and YL6616 (which are manufactured by Mitsubishi Chemical Corporation), and NC-3000 (manufactured by Nippon Kayaku Co., Ltd.).

Examples of isocyanate-modified epoxy resins which are commercially available products include AER4152 (manufactured by Asahi Kasei Epoxy Co., Ltd.) and ACR1348 (manufactured by ADEKA Corporation), each of which has an oxazolidone ring.

Examples of epoxy resins having a fluorene skeleton which are commercially available products include OGSOL PG-100, CG-200 and EG-200 (which are manufactured by Osaka Gas Chemicals Co., Ltd) and LME10169 (manufactured by Huntsman Advanced Materials).

Examples of glycidylanilines which are commercially available products include GAN (manufactured by Nippon Kayaku Co., Ltd.).

Examples of commercially available products of glycidyl toluidine include GOT (manufactured by Nippon Kayaku Co., Ltd.).

The epoxy resin(s) may be selected from triglycidyl aminophenol, triglycidyl aminocresol, tetraglycidyl amines, phenol-novolac epoxy resins, cresol-novolac epoxy resins, resorcinol epoxy resins, naphthalene epoxy resins, dicyclopentadiene epoxy resins, epoxy resins having a biphenyl skeleton, isocyanate-modified epoxy resins, alicyclic epoxy resins, triphenylmethane epoxy resins and epoxy resins having a fluorene skeleton if a cured epoxy resin composition having high heat resistance is desired.

The epoxy resin(s) may be selected from triglycidyl aminophenol, triglycidyl aminocresol, tetraglycidyl amines, naphthalene epoxy resins, epoxy resins having a biphenyl skeleton, isocyanate-modified epoxy resins, alicyclic epoxy resins, triphenylmethane epoxy resins and epoxy resins having a fluorene skeleton if a cured epoxy resin composition having high heat resistance and mechanical properties is desired.

In certain embodiments of the present invention, when the flame retardant epoxy resin composition is cured, a burn time of the cured resin is less than 10 seconds, other embodiments not more than 5 seconds and still other embodiments not more than 3 seconds, as determined by a flammability test modified from the SFI 56.1 flammability test specification for application to neat resin specimens. When the burn time is less than 10 seconds we can see a good correlation more easily to the parameters of flammability testing fiber-reinforced composite materials. (described in more detail in the Example section).

In certain embodiments of the present invention, when the flame retardant epoxy resin composition is cured, a burn length of the cured resin is not more than 0.7 inches, in other embodiments not more than 0.5 inches and still other embodiments not more than 0.3 inches, as determined by the flammability test modified from the SFI 56.1 flammability test specification for application to neat resin specimens. When the burn time is less than 10 seconds we can see a good correlation more easily to the parameters of flammability testing fiber-reinforced composite materials. (described in more detail in the Example section).

The epoxy resin may be selected from triglycidyl aminophenol, triglycidyl aminocresol and tetraglycidyl amines if it desired to obtain a cured epoxy resin composition which has high heat resistance and mechanical properties and provides a fiber-reinforced composite material of high surface quality which is comprised of the cured epoxy resin composition and a reinforcing fiber.

In one embodiment of the invention, a first bisphenol epoxy resin may be contained in the epoxy resin composition and is not particularly limited, if it is a material which is an epoxidized bisphenol.

According to other embodiments, the flame retardant epoxy resin composition preferably has a viscosity at 40° C. of from $1.0\times10^2$ to $1.0\times10^5$ poise. It is possible to obtain a prepreg having an appropriate cohesiveness by setting the viscosity at 40° C. to $1.0\times10^2$ poise or more, and it is possible to impart appropriate drape property and tackiness when laminating the prepreg by setting the viscosity at 40° C. to $1.0\times10^5$ poise or less. The viscosity at 40° C. is more preferably in the range of $1.0\times10^3$ to $5.0\times10^4$ poise and particularly preferably in the range of $5.0\times10^3$ to $2.0\times10^4$ poise. According to other embodiments, the minimum viscosity of the flame retardant epoxy resin composition is preferably 0.1 to 200 poise, more preferably 0.5 to 100 poise, and particularly preferably 1 to 50 poise. If the minimum viscosity is too low, the flow of the matrix resin might be too high so resin might be discharged out of the prepreg during prepreg curing. Furthermore, there is a possibility that the desired resin fraction might not be achieved for the fiber reinforced composite material obtained, the flow of the matrix resin in the prepreg might be insufficient, the consolidation process of the prepreg might terminate prematurely, and that many voids might occur in the fiber reinforced composite material obtained. If the minimum viscosity is too high, there is a possibility that the flow of the matrix resin in the prepreg might be low, the consolidation process of the prepreg might terminate prematurely, and many voids might occur in the fiber reinforced composite material obtained.

Herein, the viscosity 40° C. and the minimum viscosity are determined by the following method. Namely, measurements are performed using a 40 mm diameter parallel plate rheometer (ARES, manufactured by TA Instruments) with a gap of 0.6 mm. Torsional displacement is applied at 10 rad/s. The temperature is increased at 2° C./min from 40° C. to 180° C.

Component [C]

In certain embodiments of the present invention, a dicyandiamide is used as a curing agent. If dicyandiamide is used as a curing agent, the uncured epoxy resin composition has high storage stability and the cured epoxy resin composition has high heat resistance.

The amount of the dicyandiamide may be in range of 3 to 7 PHR per 100 PHR (i.e., 3 to 7 parts by weight dicyandiamide per 100 parts by weight of the total amount of epoxy resin in the epoxy resin composition). If the amount of the dicyandiamide is at least 3 PHR, the cured epoxy resin composition may have high heat resistance. If the amount of the dicyandiamide is no more than 7 PHR, the cured epoxy resin composition may have high elongation.

Examples of commercially available dicyandiamide products include DICY-7 and DICY-15 (which are manufactured by Mitsubishi Chemical Corporation) and "Dyhard (registered trademark)" 100S (manufactured by AlzChem Trostberg GmbH). In other embodiments of the present invention, any curing agent other than a dicyandiamide may be added (either in place of the dicyandiamide or in combination with the dicyandiamide), as long as the effect of the invention is not deteriorated. Examples of suitable curing agents include, but are not limited to, polyamides, amidoamines (e.g., aromatic amidoamines such as aminobenzamides, aminobenzanilides, and aminobenzenesulfonamides), aromatic diamines (e.g., diaminodiphenylmethane, diaminodiphenylsulfone [DDS]), aminobenzoates (e.g., trimethylene glycol di-p-aminobenzoate and neopentyl glycol di-p-aminobenzoate), aliphatic amines (e.g., triethylenetetramine, isophoronediamine), cycloaliphatic amines (e.g., isophorone diamine), imidazole derivatives, guanidines such as tetramethylguanidine, carboxylic acid anhydrides (e.g., methylhexahydrophthalic anhydride), carboxylic acid hydrazides (e.g., adipic acid hydrazide), phenol-novolac resins and cresol-novolac resins, carboxylic acid amides, polyphenol compounds, polysulfides and mercaptans, and Lewis acids and bases (e.g., boron trifluoride ethylamine, tris-(diethylaminomethyl) phenol). Furthermore, such curing agents may be used in combination, including in combination with dicyandiamide.

Accelerator

In certain embodiments of the present invention, at least one aromatic urea is used as an accelerator for a reaction of an epoxy resin with a curing agent and/or self-polymerization of epoxy resin. If at least one aromatic urea is used as an accelerator, the epoxy resin composition has high storage stability and the cured epoxy resin composition has high heat resistance.

The amount of at least one aromatic urea may be in range of 0.5 to 7 PHR (i.e., 0.5 to 7 parts by weight aromatic urea per 100 parts by weight of the total amount of epoxy resin in the epoxy resin composition). If the amount of the at least one aromatic urea is at least 0.5 PHR, the cured epoxy resin composition may have high heat resistance. If the amount of the aromatic urea is no more than 7 PHR, the epoxy resin composition has high storage stability.

Examples of suitable aromatic ureas include N, N-dimethyl-N'-(3, 4-dichlorophenyl) urea, toluene bis (dimethylurea), 4, 4'-methylene bis (phenyl dimethylurea), and 3-phenyl-1, 1-dimethylurea and combinations thereof. Examples of commercially available aromatic urea products include DCMU99 (manufactured by Hodogaya Chemical Co., Ltd.), and "Omicure (registered trademark)" U-24, U-24M, U-52, U-52M, and 94 (which are manufactured by Huntsman Advanced Materials). Among these, aromatic ureas having more than one urea group may be used in order to promote rapid curing properties In other embodiments of the present invention, any accelerator other than an aromatic urea may be added (either in place of aromatic urea or in combination with aromatic urea), as long as the effect of the invention is not deteriorated. Examples of suitable accelerators include, but are not limited to, sulfonate compounds, boron trifluoride piperidine, p-t-butylcatechol, sulfonate compounds (e.g., ethyl p-toluenesulfonate or methyl p-toluenesulfonate), tertiary amines and salts thereof, imidazoles and salts thereof, phosphorus curing accelerators, metal carboxylates and Lewis and Bronsted acids and salts thereof.

Examples of imidazole compounds or derivatives thereof which are commercially available products include "Curezol (registered trademark)" 2MZ, 2PZ and 2E4MZ (which are manufactured by Shikoku Chemicals Corporation). Examples of a Lewis acid catalyst include complexes of a boron trihalide and a base, such as boron trifluoride piperidine complex, boron trifluoride monoethyl amine complex, boron trifluoride triethanol amine complex, boron trichloride octyl amine complex, methyl p-toluenesulfonate, ethyl p-toluenesulfonate and isopropyl p-toluenesulfonate.

Additives—Thermoplastic

Thermoplastics

For certain embodiments of the present invention, any thermoplastic may be included in the epoxy resin composition, as long as the effect of the invention is not deteriorated. Examples of suitable thermoplastics include thermoplastics that are soluble in an epoxy resin as well as thermoplastics that are insoluble in an epoxy resin and that may be in the form of particles (i.e., thermoplastic particles). Other types of organic particles, such as rubber particles (including crosslinked rubber particles), could also be included in the epoxy resin composition.

As the thermoplastic that is soluble in an epoxy resin, a thermoplastic having a hydrogen-binding functional group, which is expected to have an effect of improving the adhesion between a cured epoxy resin composition and a reinforcing fiber, may be used. Examples of thermoplastics which are soluble in an epoxy resin and have hydrogen-binding functional groups include thermoplastics having alcoholic hydroxy groups, thermoplastics having amide bonds, and thermoplastics having sulfonyl groups. Examples of thermoplastics having hydroxyl groups include polyvinyl acetal resins such as polyvinyl formal and polyvinyl butyral, polyvinyl alcohols and phenoxy resins. Examples of thermoplastics having amide bonds include polyamides, polyimides and polyvinyl pyrrolidones. An example of a thermoplastic having sulfonyl groups is polysulfone. The polyamides, the polyimides and the polysulfones may have a functional group such as an ether bond and a carbonyl group in the main chain thereof. For example, the thermoplastic may be a polyethersulfone. The polyamides may have a substituent on a nitrogen atom in the amide group.

Examples of commercially available thermoplastics soluble in an epoxy resin and having hydrogen-binding functional groups include: "Denkabutyral (registered trademarks)" and "Denkaformal (registered trademarks)" (which are manufactured by Denki Kagaku Kogyo Kabushiki Kaisha) and "Vinylec (registered trademark)" (manufactured by JNC Corporation) which are polyvinyl acetal resins; "UCAR (registered trademark)" PKHP (manufactured by Union Carbide Corporation) which is a phenoxy resin; "Macromelt (registered trademark)" (manufactured by Henkel-Hakusui Corporation) and "Amilan (registered trademark)" CM4000 (manufactured by Toray Industries Inc.) which are polyamide resins; "Ultem (registered trademark)" (manufactured by SABIC Innovative Plastics) and "Matrimid (registered trademark)" 5218 (manufactured by Ciba Inc.) which are polyimides; "Sumikaexcel (registered trademark)" (manufactured by Sumitomo Chemical Co., Ltd.) and "UDEL (registered trademark)" (manufactured by Solvay Advanced Polymers Kabushiki Kaisha) which are polysulfones; and "Luviskol (registered trademark)" (manufactured by BASF Japan Ltd.) which is polyvinyl pyrrolidone.

Epoxy resin compositions useful in certain embodiments of the present invention may include one or more acrylic resins. The acrylic resin may have high incompatibility with an epoxy resin, and therefore may be used suitably for controlling viscoelasticity. Examples of acrylic resins which are commercially available products include "Dianal (registered trademark)" BR series (manufactured by Mitsubishi Rayon Co., Ltd.), "Matsumoto Microsphere (registered trademark)" M, M100 and M500 (which are Manufactured by Matsumoto Yushi-Seiyaku Co., Ltd.), and "Nanostrength (registered trademark)" E40F, M22N and M52N (which are manufactured by Arkema). Rubber particles may be also added. As for the rubber particles, crosslinked rubber particles and core-shell rubber particles produced by the graft polymerization of different polymers on the surfaces of crosslinked rubber particles may be used, from the viewpoint of handling properties.

Examples of crosslinked rubber particles which are commercially available products include FX501P (manufactured by Japan Synthetic Rubber Corporation) which comprises a crosslinked product of a carboxyl-modified butadiene-acrylonitrile copolymer, and the CX-MN series (manufactured by Nippon Shokubai Co., Ltd.) and YR-500 series (manufactured by Nippon Steel Chemical Co., Ltd.), each of which comprises acrylic rubber microparticles.

Examples of core-shell rubber particles which are commercially available products include "Paraloid (registered trademark)" EXL-2655 (manufactured by Kureha Corporation) which comprises a butadiene-alkyl methacrylate-styrene copolymer, "Staphyloid (registered trademark)" AC-3355 and TR-2122 (which are manufactured by Takeda Pharmaceutical Co., Ltd.) each of which comprises an acrylic acid ester-methacrylic acid ester copolymer, "PARALOID (registered trademark)" EXL-2611 and EXL-3387 (which are manufactured by Rohm & Haas) each of which comprises a butyl acrylate-methyl methacrylate copolymer, and "Kane Ace (registered trademark)" MX series (manufactured by Kaneka Corporation).

As for the thermoplastic particles, polyamide particles and polyimide particles may be used, for example. Polyamide particles are most preferable for greatly increasing the impact resistance of the cured epoxy resin composition due to their excellent toughness. Among the polyamides, nylon 12, nylon 11, nylon 6, nylon 6/12 copolymer, and a nylon (semi-IPN nylon) modified to have a semi-IPN (interpenetrating polymer network) with an epoxy compound as disclosed in Example 1 of Japanese Patent Application Laid-open No. 1-104624 impart particularly good adhesive strength in combination with the epoxy resin(s). Examples of suitable commercially available polyamide particles include SP-500 (manufactured by Toray Industries Inc.) and "Orgasol (registered trademark)" (manufactured by Arkema), "Grilamid (registered trademark)" TR-55 (manufactured by EMS-Grivory), and "Trogamid (registered trademark)" CX (manufactured by Evonik).

Inorganic Particles

In certain embodiments of the present invention, any type of inorganic particle may be added, as long as the effect of the present invention is not deteriorated. Examples of suitable inorganic particles include metallic oxide particles, metallic particles and mineral particles. Furthermore, one or more types of these inorganic particles can be used in combination. The inorganic particles may be used to improve some functions of the cured epoxy resin composition and to impart some functions to the cured epoxy resin composition. Examples of such functions include surface hardness, anti-blocking properties, heat resistance, barrier properties, conductivity, antistatic properties, electromagnetic wave absorption, UV shield, toughness, impact resistance, and low coefficient of linear thermal expansion.

Examples of suitable metallic oxides include silicon oxide, titanium oxide, zirconium oxide, zinc oxide, tin oxide, indium oxide, aluminum oxide, antimony oxide, cerium oxide, magnesium oxide, iron oxide, tin-doped indium oxide (ITO), antimony-doped tin oxide and fluorine-doped tin oxide.

Examples of suitable metals include gold, silver, copper, aluminum, nickel, iron, zinc and stainless steel. Examples of suitable minerals include montmorillonite, talc, mica, boehmite, kaoline, smectite, xonotlite, vermiculite and sericite.

Examples of other suitable inorganic materials include carbon black, acetylene black, Ketjen black, carbon nanotube, graphene, aluminum hydroxide, magnesium hydroxide, glass beads, glass flake and glass balloons.

Any suitable size of inorganic particles, for example a size which is in the range of 1 nm to 10 μm, may be used. Further, the inorganic particle may have any suitable shape, for example spherical, needle, plate, balloon or hollow. The inorganic particles may be just used as a powder or used in dispersion in a solvent like sol or colloid. Furthermore, the surfaces of the inorganic particles may be treated by one or more coupling agents to improve the dispersibility and the interfacial affinity with the epoxy resin.

In various embodiments of the present invention, the epoxy resin composition may contain any other materials in addition to or instead of the materials mentioned above, as long as the effect of the present invention is not deteriorated. Examples of other materials which may be included in the epoxy resin composition include mold release agents, surface treatment agents, flame retardants (in addition to the organic phosphinic acid or organic phosphinic acid-modified epoxy resin), antibacterial agents, leveling agents, antifoaming agents, thixotropic agents, heat stabilizers, light stabilizers, UV absorbers, pigments, coupling agents and metal alkoxides.

The components of the epoxy resin composition may be mixed in a kneader, planetary mixer, triple roll mill, twin screw extruder, and the like. The epoxy resin(s) and any thermoplastic, excluding curing agent(s) and accelerator(s), are added in the selected equipment. The mixture is then heated to a temperature in the range of 130 to 180° C. while being stirred so as to uniformly dissolve the epoxy resin(s). After this, the mixture is cooled down to a temperature of no more than 100° C., while being stirred, followed by the addition of the curing agent(s) and optional accelerator(s) and kneading to disperse those components. This method may be used to provide an epoxy resin composition with excellent storage stability.

Component [D]

In the present invention, the fiber having a thermal conductivity of greater than or equal to 3 W/m·K is not particularly limited and can be any type of a reinforcing fiber as long as it has a thermal conductivity greater than or equal to 3 W/m·K at room temperature. In certain embodiments of the present invention, the thermal conductivity of the fiber is greater than or equal to 5 W/m·K at room temperature, other embodiments greater than or equal to 7 W/m·K and still other embodiments greater than or equal to 9 W/m·K. The thermal conductivity of the fibers is determined from the thermal conductivity rating of the fibers provided by suppliers.

If the suppliers' data are not available, the thermal conductivity of the reinforcing fiber can be calculated from the thermal diffusivity, the density and the specific heat capacity measured as described below. The thermal diffusivity of the reinforcing fiber is determined by an AC Method Thermal Diffusivity Measurement System LaserPIT (manufactured by ADVANCE RIKO, Inc.) using bundles of the fibers pulled tightly on a sample holder like a sheet. The density of the reinforcing fibers is measured by a gas exchange method using a dry automatic density meter (e.g. AccuPyc 1330-03 manufactured by Micromeritics Company) and an electronic analysis balance (e.g. AEL-200 manufactured by Shimadzu Corporation), and the specific heat capacity of the reinforcing fibers is measured by a DSC method using a differential scanning calorimeter (e.g. Discovery DSC2500 manufactured by TA Instruments).

Surprisingly, it was found that when testing the flammability of composites, the ones reinforced with fiber(s) with a thermal conductivity greater than or equal to 3 W/m·K at room temperature (25° C.) had superior flammability resistance when compared to analogous composites containing more insulative fibers.

Not to be bound by theory, it is thought that the higher thermal conductivity of the fiber, when combined with the flame retardant epoxy resin composition and cured, allows a larger amount of the flame retardant phosphorus-containing component (e.g., the organic phosphinic acid(s) or organic phosphinic acid-modified epoxy resin(s)) to react with the atmosphere simultaneously, resulting in a shorter burn time and shorter burn length. This is especially evident at thinner specimen thicknesses, where the specimen has more surface area exposed to the atmosphere in proportion to the volume of the specimen.

Examples of fibers with a thermal conductivity greater than or equal to 3 W/m·K at room temperature include, but are not limited to carbon fibers, graphite fibers, metal fibers such as silicon carbide fibers, tungsten carbide fibers, and natural/bio fibers. Particularly, the use of carbon fiber may provide cured FRC materials which have exceptionally high strength and stiffness and which are lightweight as well. Examples of suitable carbon fibers are those from Toray Industries having a standard modulus of about 200-280 GPa (Torayca® T300, T300J, T400H, T600S, T700S, T700G), an intermediate modulus of about 280-340 GPa (Torayca® T800H, T800S, T1000G, T1100G, M30S, M30G), or a high modulus of greater than 340 GPa (Torayca® M40, M35J, M40J, M46J, M50J, M55J, M60J).

PAN-based and pitch-based carbon fibers are especially suitable for use in embodiments of the present invention. A PAN-based carbon fiber is a carbon fiber prepared from a polyacrylonitrile fiber precursor, while a pitch-based carbon fiber is a carbon fiber prepared from pitch. Both types of carbon fibers are well known in the art. The form and the arrangement of a layer of reinforcing fibers used to prepare a fiber-reinforced composite material in accordance with the present invention are not specifically limited. Any of the forms and spatial arrangements of the reinforcing fibers known in the art such as long fibers in a direction, chopped fibers in random orientation, single tow, narrow tow, woven fabrics, mats, knitted fabrics, and braids may be employed. The term "long fiber" as used herein refers to a single fiber that is substantially continuous over 10 mm or longer or a fiber bundle comprising the single fibers. The term "short fibers" as used herein refers to a fiber bundle comprising fibers that are cut into lengths of shorter than 10 mm. Particularly in the end use applications for which high specific strength and high specific elastic modulus are desired, a form wherein a reinforcing fiber bundle is arranged in one direction may be most suitable. From the viewpoint of ease of handling, a cloth-like (woven fabric) form is also suitable for the present invention.

The FRC materials of the present invention may be manufactured using methods such as the prepreg lamination and molding method, resin transfer molding method, resin film infusion method, hand lay-up method, wet layup method, sheet molding compound method, filament winding method and pultrusion method, though no specific limitations or restrictions apply in this respect.

The resin transfer molding method is a method in which a reinforcing fiber base material is directly impregnated with a liquid thermosetting resin composition and cured. Since this method does not involve an intermediate product, such as a prepreg, it has great potential for molding cost reduction and is advantageously used for the manufacture of structural materials for spacecraft, aircraft, rail vehicles, automobiles, marine vessels and so on.

The prepreg lamination and molding method is a method in which a prepreg or prepregs, produced by impregnating a reinforcing fiber base material with a thermosetting resin composition, is/are formed and/or laminated, followed by the curing of the resin through the application of heat and pressure to the formed and/or laminated prepreg/prepregs to obtain an FRC material.

The filament winding method is a method in which one to several tens of reinforcing fiber rovings are drawn together in one direction and impregnated with a thermosetting resin composition as they are wrapped around a rotating metal core (mandrel) under tension at a predetermined angle. After the wraps of rovings reach a predetermined thickness, it is cured and then the metal core is removed.

The pultrusion method is a method in which reinforcing fibers are continuously passed through an impregnating tank filled with a liquid thermosetting resin composition to impregnate them with the thermosetting resin composition, followed by processing through a squeeze die and heating die for molding and curing, by continuously drawing the impregnated reinforcing fibers using a tensile machine. Since this method offers the advantage of continuously molding FRC materials, it is used for the manufacture of FRC materials for fishing rods, rods, pipes, sheets, antennas, architectural structures, and so on. Of these methods, the prepreg lamination and molding method may be used to give excellent stiffness and strength to the FRC materials obtained.

Prepregs may contain the epoxy resin composition and reinforcing fibers. Such prepregs may be obtained by impregnating a reinforcing fiber base material with an epoxy resin composition in accordance with the present invention. Impregnation methods include the wet method and hot-melt method (dry method).

The wet method is a method in which reinforcing fibers are first immersed in a solution of an epoxy resin composition, created by dissolving the epoxy resin composition in a solvent, such as methyl ethyl ketone or methanol, and retrieved, followed by the removal of the solvent through evaporation via an oven, etc. to impregnate reinforcing fibers with the epoxy resin composition. The hot-melt method may be implemented by impregnating reinforcing fibers directly with an epoxy resin composition, made fluid by heating in advance, or by first coating a piece or pieces of release paper or the like with an epoxy resin composition for use as resin film and then placing a film over one or either side of reinforcing fibers as configured into a flat shape, followed by the application of heat and pressure to impregnate the reinforcing fibers with the resin. The hot-melt method may give a prepreg having virtually no residual solvent in it.

The prepreg may have a carbon fiber areal weight of between 40 to 700 $g/m^2$. If the carbon fiber areal weight is less than 40 $g/m^2$, there may be insufficient fiber content and the FRC material may have low strength. If the carbon fiber areal weight is more than 700 $g/m^2$, the drapability of the prepreg may be impaired. The prepreg may also have a resin content of between 20 to 70 wt %. If the resin content is less than 20 wt %, the impregnation may be unsatisfactory, creating large number of voids. If the resin content is more than 70 wt %, the FRC mechanical properties could be impaired. Appropriate heat and pressure may be used under the prepreg lamination and molding method, the press molding method, autoclave molding method, bagging molding method, wrapping tape method, internal pressure molding method, or the like.

The autoclave molding method is a method in which prepregs are laminated on a tool plate of a predetermined shape and then covered with bagging film, followed by curing, performed through the application of heat and pressure while air is drawn out of the laminate. It may allow precision control of the fiber orientation, as well as providing high-quality molded materials with excellent mechanical characteristics, due to a minimum void content. The pressure applied during the molding process may be 0.3 to 1.0 MPa, while the molding temperature may be in the 90 to 300° C. range (in one embodiment of the invention, in the range of 180° C. to 220° C., e.g., 200° C. to 220° C.).

The wrapping tape method is a method in which prepregs are wrapped around a mandrel or some other cored bar to form a tubular FRC material. This method may be used to produce golf shafts, fishing poles and other rod-shaped products. In more concrete terms, the method involves the wrapping of prepregs around a mandrel, wrapping of a wrapping tape made of thermoplastic film over the prepregs under tension for the purpose of securing the prepregs and applying pressure to them. After curing of the resin through heating inside an oven, the cored bar is removed to obtain the tubular body. The tension used to wrap the wrapping tape may be 20 to 100 N. The curing temperature may be in the 90 to 300° C. range (in one embodiment of the invention, in the range of 180° C. to 220° C., e.g., 200° C. to 220° C.).

The internal pressure forming method is a method in which a preform obtained by wrapping prepregs around a thermoplastic resin tube or some other internal pressure applicator is set inside a metal mold, followed by the introduction of high pressure gas into the internal pressure applicator to apply pressure, accompanied by the simultaneous heating of the metal mold to mold the prepregs. This method may be used when forming objects with complex shapes, such as golf shafts, bats, and tennis or badminton rackets. The pressure applied during the molding process may be 0.1 to 2.0 MPa. The molding temperature may be between room temperature and 300° C. or in the 120 to 180° C. range (in one embodiment of the invention, in the range of 180° C. to 220° C., e.g., 200° C. to 220° C.).

The FRC materials that are prepared from compositions of the present invention, containing particular epoxy resin compositions and reinforcing fibers, are advantageously used in general industrial applications, as well as aeronautics and space applications. The FRC materials may also be used in other applications such as sports applications (e.g., golf shafts, fishing rods, tennis or badminton rackets, hockey sticks and ski poles) and structural materials for vehicles (e.g., automobiles, bicycles, marine vessels and rail vehicles), such as drive shafts, leaf springs, windmill blades, pressure vessels, flywheels, papermaking rollers, roofing materials, cables, and repair/reinforcement materials.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the composition or process. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

In certain embodiments of the present invention, a burn time of the flame retardant fiber-reinforced composite material is less than 3 seconds, other embodiments not more than 2 seconds and still other embodiments not more than 1 seconds, as determined by the SFI 56.1 flammability testing standards. When the burn time is less than 3 seconds the sample can pass numerous flammability testing standards when more plies are added to the fiber-reinforced composite. (described in more detail in the Example section).

In certain embodiments of the present invention, when the flame retardant epoxy resin composition is cured, a burn length of the flame retardant fiber-reinforced composite material is not more than 2.0 inches, in other embodiments not more than 1.8 inches and still other embodiments not more than 1.6 inches, as determined by the SFI 56.1 flammability testing standards. When the burn length is not more than 2.0 inches the sample can pass numerous flammability testing standards when more plies are added to the fiber-reinforced composite (described in more detail in the Example section).

EXAMPLES

The present embodiments are now described in more detail by way of examples. The measurement of various properties was carried out using the methods described below. These properties were, unless otherwise noted, measured under environmental conditions comprising a temperature of 23° C. and a relative humidity of 50%. Prepreg was then made from the example resins using a hot melt prepreg method. The components used in the working examples and comparative examples are as follows.

Component [A]: <Epoxy Resin>

Bisphenol A epoxy resin, Epon™ 828 having an EEW of 185-192 g/eq (manufactured by Hexion, Inc.).

Bisphenol A epoxy resin, Epon™ 3002 having an EEW of 520-590 g/eq (manufactured by Hexion, Inc.).

Tetraglycidyl diaminodiphenylmethane, "Araldite (registered trademark)" MY9655T having an EEW of 117-134 g/eq (manufactured by Huntsman Advanced Materials). DOPO (di-hydro-9-oxa-10-phospha-phenanthrene-10-oxide)-modified multifunctional epoxy resin EXA-9726 (Manufactured by Dainippon Ink & Chemicals Inc.).

Component [B]

Diethyl Phosphinic Acid

Diphenyl Phosphinic Acid

Component [E]: <Adduct of the Organic Phosphinic Acid and the Multifunctional Epoxy Resin>

Reaction product of diethyl phosphinic acid and "Araldite (registered trademark)" MY9655T at an equivalency ratio of 1:4 respectively.

Component [C]: <Curing Agent>

Dicyandiamide, "Dyhard (registered trademark)" 100S having an AEW of 12 g/eq (manufactured by AlzChem Trostberg GmbH).

4,4-diaminodiphenylsulfone "Aradur (registered trademark)" 9664-1 (manufactured by Huntsman Advanced Materials)

<Accelerator>

2,4'-Toluene bis (dimethyl urea), "Omicure (registered trademark)" U-24M (manufactured by Huntsman Advanced Materials).

<Thermoplastic>

Poly Vinyl Formal "Vinylec (registered trademark)" K (manufactured by JNC Corporation).

Component [D]: <Reinforcing Fiber>

Carbon Fiber Fabric T300-3k Plain Weave fabric style #4163 (fiber manufactured by Toray, fabric woven by Textile Products, Inc.).

Carbon Fiber "Torayca®" T300B-3k-40B Fiber (Tensile Strength: 3.5 GPa, Tensile Modulus: 230 GPa, Elongation: 1.5%, manufactured by Toray).

Carbon Fiber Fabric T700S-12k Plain Weave fabric CK6244C (fiber manufactured by Toray, fabric woven by Textile Products, Inc.).

Carbon Fiber "Torayca®" T700SC-12k-50C Fiber (Tensile Strength: 4.9 GPa, Tensile Modulus: 230 GPa, Elongation: 2.1%, manufactured by Toray).

Carbon Fiber "Torayca®" T800SC-24k-10E Fiber (Tensile Strength: 5.9 GPa, Tensile Modulus: 294 GPa, Elongation: 2.0%, manufactured by Toray).

Carbon Fiber "Torayca®" T1100GC-24k-71E Fiber (Tensile Strength: 7.0 GPa, Tensile Modulus: 324 GPa, Elongation: 2.0%, manufactured by Toray).

Carbon Fiber "Torayca®" M40JB-12k-50B Fiber (Tensile Strength: 4.4 GPa, Tensile Modulus: 377 GPa, Elongation: 1.2%, manufactured by Toray).

Glass Fiber S-2 Glass (manufactured by AGY).

Aramid Fiber "Kevlar®" K-29 yarn (manufactured by Dupont).

(1) Resin Mixing

A mixture was created by dissolving prescribed amounts of all the components other than the curing agent and an accelerator in a mixer, and then prescribed amounts of the curing agent were mixed into the mixture along with amounts of the accelerator to obtain the epoxy resin composition. Table 1 summarizes the composition of various exemplary resin compositions, curing conditions and properties of resulting cured resins.

(2) Adduct Formation

The reacted product of diethyl phosphinic acid and "Araldite (registered trademark)" MY9655T) was made via constant stirring of the epoxy resin and the diethyl phosphinic acid at the prescribed ratios at a temperature of 100° C. for one hour.

(3) Resin Flammability (Burn Time, Burn Length)

The specimens detailed in the Working and Comparative Examples were tested for flame retardancy per a flammability test modified from the SFI 56.1 flammability test specification for application to neat resin specimens. The SFI 56.1 Specification is specifically for CFRP testing. Because the example specimens are fiber free when tested, the test needed to be modified.

The resin flammability test involved taking mixed resin that has been defoamed under vacuum and high shear mixing, casting the resin between two plates, with a 2 mm "Teflon (registered trademark)" spacer, and curing at a specified temperature for a set amount of time. For the examples presented herein, the epoxy resin composition was cured at a temperature of 163° C. for 15 min, ramping to said temperature at a rate of 10° C./min. The cured resin plates were then demolded and machined into specimens measuring 2 inches×3 inches. The resin plates were placed in a flammability test chamber as shown in the FIGURE. The flame is at least 1550° F., with the visible flame being approximately 22 mm high when measured from the burner base, with the flame's faint outer blue cone at approximately 38 mm height from the burner base. The 3 inches side of the resin plate specimen was centered approximately 19 mm above the burner base. The flame was moved to underneath the resin specimen and held in place for 15 seconds, at which point the flame was removed and the time it took for the flame to extinguish was measured. Additionally, any drips of flaming epoxy resin material were recorded and the time those drips remain on fire was recorded. The witnessing of drips was considered an automatic failure of the flammability test. The burned length of the specimen was also recorded. The values of burn time and burn length were used to characterize a resin specimen's flammability. A lower burn time and a lower burn length are preferred qualities for flame retardant materials.

(4) Resin Glass Transition Temperature (Tg by DMA Torsion)

The cured epoxy resin composition was molded by the method described below. After defoaming under vacuum and high shear mixing, the epoxy resin composition prepared in (1) was injected into a mold set for a thickness of 2 mm using a 2 mm-thick "Teflon (registered trademark)" spacer. Then, the epoxy resin composition was cured at a specified temperature for a set amount of time. For the examples presented herein, the resin was cured at a temperature of 163° C. for 15 min, ramping to said temperature at a rate of 10° C./min.

The specimen was then subjected to a Tg measurement in 1.0 Hz torsion mode using a dynamic viscoelasticity measuring device (ARES, manufactured by TA Instruments) by heating it to temperatures of 50° C. to 250° C. at a rate of 5° C./min in accordance with SACMA SRM 18R-94.

Tg was determined by finding the intersection between the tangent line of the glass region and the tangent line of the transition region from the glass region to the rubber region on the temperature-storage elasticity modulus curve (also called the G' Tg), and the temperature at that intersection was considered to be the glass transition temperature (also called the G' Tg).

However, when the cured resin composition has one or more viscous modulus (G") peaks, Tg was determined by the following method. The height of each peak was calculated by subtracting the peak height in MPa by the corresponding valley that precedes the peak. If the height of any one of these peaks is over 15 MPa, then the corresponding transition on the G' curve was used to calculate the Tg.

(5) Resin Flexural Modulus of Elasticity

Flexural properties were measured in accordance with the following procedure. A specimen measuring 10 mm×50 mm was cut from the cured epoxy resin composition obtained following the process under Glass Transition Temperature (Tg), as described above in (4). Then, the specimen is processed in a 3-point bend flexural test in accordance with ASTM D7264 using an Instron Universal Testing Machine (manufactured by Instron). The test specimens are tested at room temperature to obtain the RTD (Room Temperature Dry) flexural properties of the cured epoxy resin composition.

(6) Composite Flammability Testing (Burn Length, Burn Time)

For composite flammability testing, the fiber type specified was preimpregnated with the resin type specified at a specified fiber areal weight (FAW) and resin content (RC). Single plies of the specimen were cut out to 12"×12" sizes and cured at 163° C. for 15 min in an autoclave. The single ply cured panels were machined down to 3 inches×12 inches specimens, with the 0° fiber direction parallel to the 12" length sides. These single ply specimens were then tested per SFI 56.1 flammability testing standards with burn length and burn time recorded for each specimen.

(7) Thermal Conductivity of Fiber

The thermal conductivities of the fibers listed in Tables 2, 3 and 4 come from the reported values provided by the suppliers of the fibers.

(8) Production of Fiber-Reinforced Composite Material

A prepreg comprising the specified reinforcing fiber impregnated with the specified epoxy resin composition was prepared. The epoxy resin composition obtained in method (1) was applied onto release paper using a knife coater to produce two sheets of resin film. Next, the aforementioned two sheets of fabricated resin film were overlaid on both sides of the specified fiber configuration in the form of a sheet and the epoxy resin composition was impregnated using rollers and/or vacuum bagging to produce a prepreg with a carbon fiber areal weight of and resin content as specified.

(9) Fiber Areal Weight

Resin Areal Weight (RAW) was determined by taking the filmed resin, prior to prepregging, and cutting out 100×100 mm square samples, scraping off the resin on the squares, and measuring the weight of the resin. The areal weight is twice this weight divided by the area of the square sample. Fiber Areal Weight (FAW) was measured via a similar method post prepregging, by cutting out 100×100 mm square samples, weighing the prepreg and subtracting the RAW from this value.

(10) Resin Content

The Resin Content (RC) is the % by weight of the resin in the prepreg.

$$RC = \frac{RAW}{(RAW + FAW)}$$

The following measurement methods were used to characterize the cured epoxy resin compositions for each working and comparative example:

(3) Resin Flammability (Burn Length, Burn Time, Drips)
(4) Resin Glass Transition Temperature (Tg)
(5) Resin Flexural Modulus of Elasticity The following measurement methods were used to characterize the fiber-reinforced composite material compositions for each working and comparative example:

(6) Composite Flammability Testing
(7) Thermal Conductivity of Fiber
(9) Fiber Areal Weight (FAW)
(10) Resin Content Working Examples 1-11 and Comparative Example 1-4

The various amounts for each example epoxy resin composition are summarized in Table 1 and the various amounts for each example fiber-reinforced composite material are stated in Tables 2, 3, and 4. The epoxy resin compositions shown in Table 1 were produced in accordance with the following method: A mixture was created by dissolving prescribed amounts of all the components other than the curing agent and accelerator in a mixer, and then prescribed amounts of the curing agent were mixed into the mixture along with prescribed amounts of the accelerator to obtain the epoxy resin composition.

The produced epoxy resin compositions were cured by the methods described in the various testing descriptions. The results for each test are stated in Table 1. The epoxy resin compositions were then combined with the described fibers via a prepreg laminating process at the prescribed FAW and resin content. The results for composite tests are stated in Tables 2, 3, and 4.

Working Examples 1 to 11 in Tables 2 and 3, being embodiments of the invention, provided good flammability results.

Working Example 1, 3 and Comparative Example 1

Comparative Example 1 utilizes Example Resin 6 (which did not contain any organic phosphinic acid-containing compound), while Working Examples 1 and 3 utilize Example Resins 1 and 2, respectively (which contained an organic phosphinic acid-modified epoxy resin). Comparative Example 1 has a burn time of 22 seconds and a burn length of 12 inches (full), while Working Examples 1 and 3 have burn times of 0 seconds and burn lengths of 1.5 inches and 1.9 inches, respectively.

Working Example 2 and Comparative Examples 2-3

Working Example 2 and Comparative Examples 2-3 utilize different reinforcing fibers with different thermal conductivity values. While all three examples have burn times of 0 seconds (meaning the specimen self-extinguished before the flame was removed from the specimen), their burn lengths vary. The most thermally conductive fiber, T300 of WE2, resulted in the lowest burn length (1.7 inches), while the more insulative fibers, S-2 Glass of CE2 and K-29 of CE3, resulted in higher burn lengths (2.3 inches and 2.7 inches respectively), with the highest burn length corresponding to the most insulative fiber.

Working Examples 1, 4 and Comparative Example 4

In working example 1, 4 and comparative example 4, CE4 used EXA-9726, a DOPO (Di-hydro-9-oxa-10-phospha-phenantrene-10-oxide)-modified bifunctional epoxy resin (i.e., an organic phosphorus acid-modified epoxy resin), rather than an organic phosphinic acid-modified bifunctional epoxy resin as in WE1 and WE4. While WE7 maintains a burn time of 0 seconds, the burn time of CE4 is higher at 4 seconds.

TABLE 1

| | | | Flame Retardant Epoxy Resin Compositions | | | | | | |
|---|---|---|---|---|---|---|---|---|---|
| | | Unit | Example Resin 1 | Example Resin 2 | Example Resin 3 | Example Resin 4 | Example Resin 5 | Example Resin 6 | Example Resin 7 |
| Component [A] | Epon ™ 828 | PHR | 10 | 10 | 10 | 10 | 10 | 10 | 13 |
| | Epon ™ 3002 | PHR | 10 | 10 | 10 | 10 | 10 | 10 | 10 |
| | Araldite ® MY9655T | PHR | 50 | 70 | 80 | 80 | 80 | 80 | 53 |
| | EXA-9726 | PHR | — | — | — | — | — | — | 24 |
| Component [B] | Diethyl Phosphinic Acid | PHR | — | — | 7 | — | 9.5 | — | — |
| | Diphenyl Phosphinic acid | PHR | — | — | — | 13.4 | — | — | — |
| Component [E] | Diethyl Phosphinic Acid + Araldite ® MY9655T | PHR | 30 | 10 | — | — | — | — | — |
| Component [C] | Dyhard ® 100S (Dicyandiamide) | PHR | 5 | 5 | 5 | 5 | — | 5 | 5 |
| | Aradur ® 9664-1 | PHR | — | — | — | — | 46 | — | — |
| Accelerator | U-24 | PHR | 3 | 3 | 3 | 3 | — | 3 | 3 |
| Thermoplastic | Vinylec ® K | PHR | 5 | 5 | 5 | 5 | 5 | 5 | 5 |
| Curing cycle | | | 163° C. × 15 minutes | | | | | | |
| Cured Epoxy Resin properties | Total Phosphorus Content of Resin | wt % | 1.5 | 0.5 | 1.5 | 1.5 | 1.5 | 0.0 | 1.5 |
| | Glass Transition temperature | ° C. | 167 | 192 | 170 | 157 | 187 | 213 | 167 |
| | Flexural modulus of elasticity | GPa | 3.6 | 3.6 | 3.8 | 4.1 | 3.6 | 3.3 | — |
| | Resin Burn Length | in | 0.3 | 0.6 | 0.3 | 0.3 | 0.2 | Full (2.0) | 0.4 |
| | Resin Burn Time | sec | 3.6 | 4.0 | 1.4 | 1.4 | 1.4 | 72.0 | 13.5 |

*Amounts of ingredients are listed in ratios of PHR (per 100 epoxy resin)

TABLE 2

| | | | Flame Retardant Fiber-Reinforced Composite Material | | | | | |
|---|---|---|---|---|---|---|---|---|
| | | Unit | WE 1 | WE 2 | WE 3 | WE 4 | WE 5 | WE 6 |
| Example Epoxy Resin Composition Used | Example Resin 1 | | X | X | | | | |
| | Example Resin 2 | | | | X | | | |
| | Example Resin 3 | | | | | X | | |
| | Example Resin 4 | | | | | | X | |
| | Example Resin 5 | | | | | | | X |
| Cure Cycle | | | 163° C. × 15 min | | | | | |
| Composite composition | Fiber Type | | T300-3k | | | | | |
| | Conductivity | W/m · K | 10.46 | | | | | |
| | Configuration | | PW Fabric | T300B-3k-40B | PW Fabric | PW Fabric | PW Fabric | PW Fabric |
| | FAW | g/m$^2$ | 205 | 190 | 205 | 205 | 205 | 205 |
| | RC | % | 42 | 42 | 42 | 42 | 42 | 42 |
| Flammability Testing SFI 56.1 | Burn Length | in | 1.5 | 1.7 | 1.9 | 1.5 | 1.5 | 1.4 |
| | Burn Time | sec | 0 | 0 | 0 | 0 | 0 | 0 |

TABLE 3

| | | | Flame Retardant Fiber-Reinforced Composite Material | | | | |
|---|---|---|---|---|---|---|---|
| | | Unit | WE 7 | WE 8 | WE 9 | WE 10 | WE 11 |
| Example Epoxy Resin Composition Used | Example Resin 1 | | X | X | X | X | X |
| | Example Resin 2 | | | | | | |
| | Example Resin 3 | | | | | | |
| | Example Resin 4 | | | | | | |
| | Example Resin 5 | | | | | | |

TABLE 3-continued

| | | | Flame Retardant Fiber-Reinforced Composite Material | | | | |
|---|---|---|---|---|---|---|---|
| | | Unit | WE 7 | WE 8 | WE 9 | WE 10 | WE 11 |
| Cure Cycle | | | | | 163° C. × 15 min | | |
| Composite Composition | Fiber Type | | T700SC-12k-50C | T700SC-12k-50C | T800SC-24k-10E | T1100GC-24k-71E | M40JB-12k-50B |
| | Conductivity | W/m · K | 9.58 | 9.58 | 11.30 | 12.97 | 66.90 |
| | Configuration | | PW Fabric | UD | UD | UD | UD |
| | FAW | $g/m^2$ | 210 | 190 | 190 | 190 | 190 |
| | RC | % | 42 | 42 | 42 | 42 | 42 |
| Flammability Testing | Burn Length | in | 1.5 | 1.7 | 1.6 | 1.5 | 1.2 |
| SFI 56.1 | Burn Time | sec | 0 | 0 | 0 | 0 | 0 |

TABLE 4

| | | | Flame Retardant Fiber-Reinforced Composite Material | | | |
|---|---|---|---|---|---|---|
| | | Unit | CE 1 | CE 2 | CE 3 | CE 4 |
| Example Epoxy Resin | Example Resin 1 | | | X | X | |
| Composition Used | Example Resin 6 | | X | | | |
| | Example Resin 7 | | | | | X |
| Cure Cycle | | | | 163° C. × 15 min | | |
| Composite Composition | Fiber Type | | T300-3k | S-2 Glass | K-29 | T300-3k |
| | Conductivity | W/m · K | 10.46 | 1.45 | 0.04 | 10.46 |
| | Configuration | | PW Fabric | UD | UD | PW Fabric |
| | FAW | $g/m^2$ | 205 | 190 | 190 | 205 |
| | RC | % | 42 | 42 | 42 | 42 |
| Flammability Testing | Burn Length | in | Full (12) | 2.3 | 2.7 | 2.0 |
| SFI 56.1 | Burn Time | sec | 22 | 0 | 0 | 4 |

What is claimed is:

1. A flame retardant composition comprising:

i) an epoxy resin composition comprising a component [C], and a component [E], and ii) a component [D], wherein:

the epoxy resin composition has a phosphorus content of at least 0.5% but no greater than 5% by weight based on the total weight of the epoxy resin composition;

the component [C] is comprised of at least one curing agent;

the component [D] is comprised of at least one reinforcing fiber with a thermal conductivity≥3 W/m·K at room temperature;

the component [E] is comprised of at least one epoxy resin having a functionality of 4 that contains at least one residue of at least one organic phosphinic acid;

the at least one residue of at least one organic phosphinic acid corresponds to formula (II):

(II)

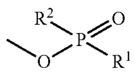

wherein $R^1$ and $R^2$ are independently selected from an alkyl group having from 1 to 10 carbon atoms and an aryl group having from 6 to 10 carbon atoms, and wherein the epoxy resin composition further comprises at least one thermoplastic wherein the at least one thermoplastic includes at least one polyvinylformal.

2. The flame retardant composition according to claim 1, wherein the component [E] includes at least one epoxy resin corresponding to formula (III):

(III)

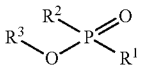

wherein $R^1$ and $R^2$ of formula (III) are independently selected from an alkyl group having from 1 to 10 carbon atoms and an aryl group having from 6 to 10 carbon atoms, and $R^3$ is a residue of at least one tetraglycidyl diaminodiphenyl methane in which at least one epoxy group of the tetraglycidyl diaminodiphenyl methane has been reacted to introduce a substituent —O—P(=O)$R^1R^2$ in a ratio of 1:4 organic phosphinic acid to epoxy equivalent ratio.

3. The flame retardant composition according to claim 1, wherein the epoxy resin composition further comprises a component [A], which is comprised of at least one epoxy resin, and/or a component [B], which is comprised of at least one organic phosphinic acid.

4. The flame retardant composition according to claim 1, wherein:

the epoxy resin composition additionally comprises at least one accelerator, the at least one curing agent includes at least one dicyandiamide, and the accelerator includes at least one aromatic urea.

5. The flame retardant composition according to claim 1, wherein the at least one reinforcing fiber includes at least one carbon fiber.

6. The flame retardant composition according to claim 1, wherein the flame retardant composition is in a form of a prepreg.

7. The flame retardant composition according to claim 6, wherein the layer of the reinforcing fibers is unidirectional or fabric.

8. The flame retardant composition according to claim 6, wherein the prepreg comprises polyamide particles and polyimide particles.

9. The flame retardant composition according to claim 6, wherein the flame retardant composition contains virtually no residual solvent.

10. The flame retardant composition according to claim 9, wherein the flame retardant composition is impregnated into a reinforced fiber substrate using a hot-melt method.

11. The flame retardant composition according to claim 6, wherein the flame retardant composition has a viscosity at 40° C. of from $1.0\times10^2$ to $1.0\times10^5$ poise.

12. The flame retardant composition according to claim 6, wherein the minimum viscosity of the flame retardant composition is 0.1 to 200 poise.

13. The flame retardant composition according to claim 1, wherein the epoxy resin composition further comprises one or more additional epoxy resins not containing at least one residue of at least one organic phosphinic acid.

14. The flame retardant composition according to claim 13, wherein the epoxy resin having a functionality of 4 that contains at least one residue of at least one organic phosphinic acid is tetraglycidyl diaminodiphenyl methane that contains at least one residue of at least one organic phosphinic acid and the epoxy resin not containing at least one residue of at least one organic phosphinic acid is tetraglycidyl diaminodiphenyl methane.

15. The flame retardant composition according to claim 14, wherein the tetraglycidyl diaminodiphenyl methane not containing at least one residue of at least one organic phosphinic acid is present in an amount of 10 to 30 PHR and the tetraglycidyl diaminodiphenyl methane containing at least one residue of at least one organic phosphinic acid is present in an amount of 50 to 70 PHR.

* * * * *